(No Model.)
H. DECK.
JOURNAL BOX.
No. 497,017. Patented May 9, 1893.
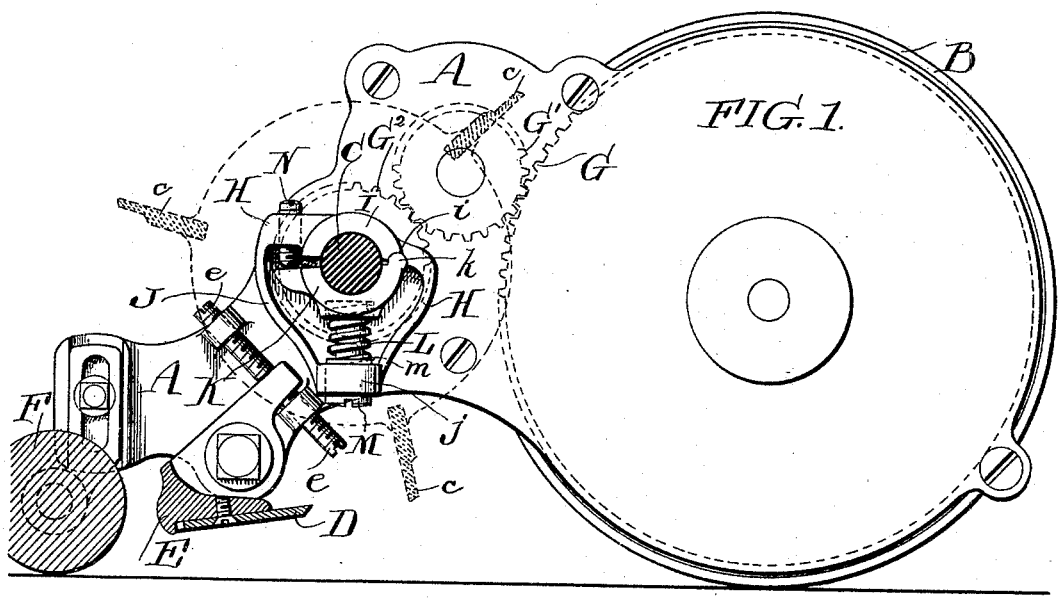
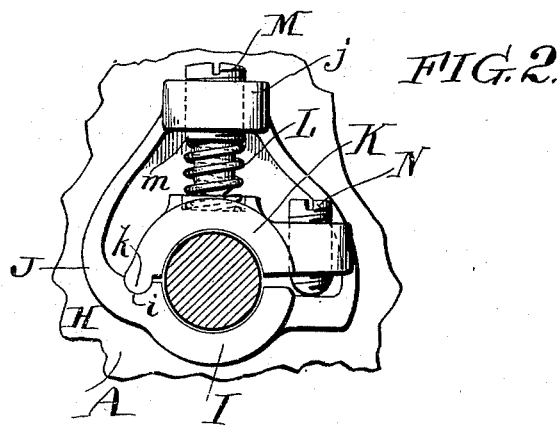
Witnesses:
Henry Drury
Clyde M. Dietterich
Inventor:
Henry Deck
By his atty
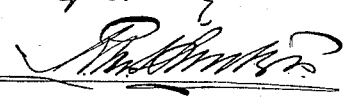

UNITED STATES PATENT OFFICE.

HENRY DECK, OF PHILADELPHIA, PENNSYLVANIA, ASSIGNOR TO JOHN BRAUN, JOHN F. BRAUN, AND WILLIAM P. M. BRAUN, OF SAME PLACE.

JOURNAL-BOX.

SPECIFICATION forming part of Letters Patent No. 497,017, dated May 9, 1893.

Application filed August 13, 1892. Serial No. 443,017. (No model.)

*To all whom it may concern:*

Be it known that I, HENRY DECK, of Philadelphia, in the county of Philadelphia and State of Pennsylvania, have invented an Improvement in Journal-Boxes, of which the following is a specification.

My invention relates to journal boxes and consists of certain improvements which are fully set forth in the following specification and are shown in the accompanying drawings which form a part thereof.

My improved journal boxes are adapted particularly for lawn mowers, in which they may be used to support the journals of the shaft of the rotary cutter, and in the accompanying drawings I have shown them so applied; but it will be apparent that these journal boxes may be used in other machines than lawn mowers.

The object of my invention is to obtain a journal box having adjustable bearings, which may be easily fitted to the journal of the shaft, and may be adjusted to take up wear. In attaining these results it is my object also to render the adjustment as simple as possible.

In carrying out my invention I employ a journal box having a stationary member and a movable spring pressed member, the movable member being controlled by a suitable adjusting device. By this means the adjustment may be accomplished by a single adjusting pin or screw and may be made from the upper side or top of the machine.

My improved journal box may be so applied that it will permit the shaft to yield so as to permit the cutters or devices carried by the shaft to adjust themselves automatically to any irregularities or unevenness in the part with which they make contact. This is particularly desirable in lawn mowers as it permits the blades of the rotary cutter to be so adjusted that they will make constant contact with the stationary or ledger knife, without danger of jamming.

In the drawings:—Figure 1 is a transverse vertical sectional view of a lawn mower embodying my improvements. Fig. 2 is an end elevation of one of the journal boxes of the rotary cutter shaft illustrating a modification of the invention.

A is one of the side frames of the machine.

B is one of the driving wheels.

C is the shaft of the rotary cutter carrying the usual spiral cutters $c$.

D is the stationary ledger knife carried by the bar E.

F is the usual guide roller carried by the side frames and located in the front of the machine in the rear of the knife D.

$e\ e$ are the usual adjusting screws for adjusting the cutter bar E.

It is immaterial to my invention in what manner the rotary cutter shaft C is driven from the wheels B. For the purpose of illustration I have shown driving mechanism of the character described in Letters Patent No. 208,788, dated October 8, 1878.

G is a large driving gear driven by suitable pawl and ratchet mechanism by the driving wheels B, and thence transmitting motion to the shaft C of the rotary cutter through the gears $G'\ G^2$.

H is the journal box carried upon the inner face of each side frame A. This journal box consists of a stationary bearing I carried by a bracket J upon the frame A and a movable bearing K hinged or otherwise connected at one end as at $k$ with the stationary bearing I, the two parts I and K together forming a substantially round bearing for the shaft C. The movable part K may be positively hinged to the stationary part I or it may be connected therewith by inserting its rounded edge in a groove $i$ in the part I, as shown in Figs. 1 and 2.

L is a spring bearing upon the movable part K of the journal box to permit the movable part to yield, thus forming a yielding bearing for the cutter shaft C.

To adjust the tension of the spring L I prefer to employ an adjusting screw M carried in an extension $j$ of the bracket J and having a shoulder or offset $m$ against which the outer end of the spring bears.

N is an adjusting screw carried by one of the parts I and K and bearing upon the other, by means of which the movable bearing K may be positively adjusted to and from the stationary bearing I; and as this adjusting screw is carried by one of the parts only it does not obstruct the movement of the movable part under the control of the spring L. The screw N thus constitutes a stop to limit the movement of the movable part of the bearing under the action of the spring.

In the construction shown in Fig. 1 the movable part K constitutes the lower bearing while in the construction shown in Fig. 2 the movable part is above and forms the upper bearing. In the latter construction the movable bearing K being the upper portion of the journal box permits the shaft C to yield and thus adjust its cutters c automatically to any unevenness or irregularity in the ledger or stationary knife D. With this construction the cutters c may be adjusted so as to make contact with the cutting edge of the ledger blade D, without danger of jamming, and thus a more perfect cutting action may be obtained and the blades will sharpen themselves.

A great advantage in employing the movable yielding portion K, is that the bearings may be adjusted to fit the shaft and take up wear solely by the adjustment of a single screw M, instead of by the tightening of one screw and the loosening of another as has been necessary heretofore. Another advantage of this construction is that the adjustment may be made solely from the upper side of the machine as the adjusting screws are presented upward, and it is not necessary to turn over the machine to make the adjustment.

While I prefer the minor details of construction that have been shown I do not mean to limit myself to them as it is apparent that they may be varied without departing from my invention.

While my journal box is particularly adapted for lawn mowers, it is apparent that it may be applied to other machines also.

What I claim as new, and desire to secure by Letters Patent, is—

1. A journal box for lawn mowers &c., consisting of a fixed bearing portion and a movable bearing portion, in combination with a spring acting externally upon the movable bearing portion to force it toward the fixed bearing portion, and an adjusting screw to adjust the movable bearing portion against the action of the spring.

2. A journal box consisting of two parts one being stationary and the other movable and spring pressed toward the stationary part, and an adjusting device to move the movable part away from the stationary part against the action of the spring.

3. A journal box consisting of a stationary part and a movable part jointed at one end to the stationary part and having the other end free, a spring acting upon the movable part to force it toward the stationary part, and an adjusting screw carried by the free end of one of the parts and bearing upon the free end of the other part.

4. In a journal box, the combination with the side frame, of a stationary bearing I carried thereby, a movable bearing K carried by the stationary bearing, a spring L acting upon the movable bearing and pressing it toward the stationary bearing and the adjusting screw N carried by one part and acting upon the other against the action of the spring.

5. A journal box consisting of a lower stationary member, an upper movable member spring pressed toward the stationary member, and an adjusting screw carried by one member and bearing upon the other to move the upper movable member away from the lower stationary member against the action of the spring.

6. A journal box consisting of a stationary part and a movable part, a spring acting upon the movable part to force it toward the stationary part, means to adjust the tension of the spring, and a stop carried by one part and bearing against the other to limit the movement of the movable part toward the stationary part under the action of the spring.

7. A journal box consisting of a stationary member and a movable member provided each with bearing faces, an adjusting screw M, a spring L carried by the adjusting screw and bearing upon the movable member to force its bearing face toward the bearing face of the stationary member, and a stop carried by one member and bearing against the other to limit the movement of the movable member toward the stationary member under the action of the spring L.

In testimony of which invention I have hereunto set my hand.

HENRY DECK.

Witnesses:
WM. P. M. BRAUN,
ERNEST HOWARD HUNTER.